US006356824B1

(12) United States Patent
Chene et al.

(10) Patent No.: US 6,356,824 B1
(45) Date of Patent: Mar. 12, 2002

(54) VEHICLE SYSTEMS DATA STORAGE

(75) Inventors: George Chene; Lee A. French, both of Sterling Heights; Dennis A. Kramer, Troy; Gerald D. Lawruk, Clarkston; Brian Jeffrey Mueller, Lake Orion; Reno V. Ramsey, Sterling Heights; Wayne Shintaku, Auburn Hills; Jack R. Worrall, Novi, all of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/767,932

(22) Filed: Jan. 23, 2001

(51) Int. Cl.[7] .................................... G06F 19/00

(52) U.S. Cl. ........................ 701/35; 701/33; 701/99; 701/114

(58) Field of Search ........................ 701/35, 31, 29, 701/33, 34, 45, 50, 51, 53, 54, 70, 93, 99, 102, 114

(56) References Cited

U.S. PATENT DOCUMENTS

| | | | |
|---|---|---|---|
| 4,204,255 | A | 5/1980 | Cremer |
| 4,404,641 | A | 9/1983 | Bazarnik |
| 4,441,359 | A | 4/1984 | Ezoe |

(List continued on next page.)

OTHER PUBLICATIONS

U.S. Patent Application and Drawings for "Personal Data Computer For Vehicle Monitoring"; Ser. No. 09/591,970; Filed Jun. 12, 2000.

U.S. Patent Application and Drawing for "Individualized Vehicle Settings", Ser. No. 09/767,930; Filed Jan. 22, 2001.

U.S. Patent Application and Drawing for "Vehicle Inspection and Maintenance System" Filed on Aug. 8, 2001.

U.S. Patent Application and Drawings for "Vehicle Driver Data", Ser. No. 09/850,455; Filed May 7, 2001.

U.S. Patent Applicaiton and Drawing for "Vehicle Data Display Device", Ser. No. 09/716,718; Filed Nov. 20, 2000.

U.S. Patent Application and Drawings for "Automated Vehicle Shutdown Sequence", Ser. No. 09/767,999; Filed Jan. 23, 2001.

U.S. Patent Application and Drawings for "Smart Card System For Heavy Vehicles" Ser. No. 09/522,352; Filed Mar. 9, 2000.

*Primary Examiner*—Richard M. Camby
(74) *Attorney, Agent, or Firm*—Carlson, Gaskey & Olds

(57) ABSTRACT

A vehicle data storage system is provided which includes a plurality of sensors for sensing vehicle operating conditions, such as engine temperature. A control module receives the vehicle operating conditions and translates the vehicle operating conditions into vehicle information. A portable hand held computing device, such as a Handspring® or Palmpilot®, has a data storage device or memory that receives the vehicle information. The data storage device is limited by a particular memory capacity. A secondary storage device receives the vehicle information from the data storage device from the portable hand held computing device when the memory capacity reaches a desired memory capacity level, such as when there is only 10% of the memory left in the data storage device. Additionally, one of the vehicle operating conditions in one of the subsystem control modules may comprise a triggering event. The triggering event may be detecting a high engine temperature in an engine temperature sensor. The subsystem control module then produces a request signal for event data in response to the triggering event. A memory buffer stores the vehicle information from all of the subsystem control modules. The event data is defined by a first predetermined time before the triggering event to a second predetermined time after the triggering event so that the data surrounding the triggering event resides in the memory buffer. The data in the memory buffer is written over by new data unless a request signal is received. A secondary storage device receives the event data in response to the request signal.

22 Claims, 1 Drawing Sheet

U.S. PATENT DOCUMENTS

| | | | | | |
|---|---|---|---|---|---|
| 4,477,874 | A | | 10/1984 | Ikuta et al. | |
| 4,533,900 | A | | 8/1985 | Muhlberger et al. | |
| 4,660,140 | A | | 4/1987 | Illg | |
| 4,707,788 | A | | 11/1987 | Tashiro et al. | |
| 4,731,769 | A | | 3/1988 | Schaefer et al. | |
| 4,739,482 | A | | 4/1988 | Wrigge | |
| 4,773,011 | A | | 9/1988 | VanHoose | |
| 4,787,041 | A | | 11/1988 | Yount | |
| 4,926,331 | A | | 5/1990 | Windle et al. | |
| 4,939,652 | A | | 7/1990 | Steiner | |
| 4,975,847 | A | | 12/1990 | Abe et al. | |
| 5,046,007 | A | | 9/1991 | McCrery et al. | |
| 5,091,856 | A | | 2/1992 | Hasegawa et al. | |
| 5,253,052 | A | | 10/1993 | Hanashiro et al. | |
| 5,365,436 | A | | 11/1994 | Schaller et al. | |
| 5,400,018 | A | | 3/1995 | Scholl et al. | |
| 5,475,399 | A | | 12/1995 | Borsuk | |
| 5,479,347 | A | * | 12/1995 | Oguro et al. | 701/33 |
| 5,555,171 | A | | 9/1996 | Sonehara et al. | |
| 5,680,328 | A | | 10/1997 | Sorupski et al. | |
| 5,778,381 | A | | 7/1998 | Sandifer | |
| 5,787,373 | A | | 7/1998 | Migues | |
| 5,797,107 | A | | 8/1998 | Berg et al. | |
| 5,801,767 | A | | 9/1998 | Wu | |
| 5,812,399 | A | | 9/1998 | Judic et al. | |
| 5,848,365 | A | | 12/1998 | Coverdill | |
| 5,859,628 | A | | 1/1999 | Ross et al. | |
| 5,916,286 | A | * | 6/1999 | Seashore et al. | 701/33 |
| 5,931,878 | A | | 8/1999 | Chapin, Jr. | |
| 5,933,125 | A | | 8/1999 | Fernie et al. | |
| 5,948,026 | A | | 9/1999 | Beemer, II et al. | |
| 5,961,561 | A | | 10/1999 | Wakefield, II | |
| 5,964,813 | A | | 10/1999 | Ishii et al. | |
| 5,990,800 | A | | 11/1999 | Tamaki et al. | |
| 6,003,808 | A | | 12/1999 | Nguyen et al. | |
| 6,006,147 | A | | 12/1999 | Hall et al. | |
| 6,006,148 | A | | 12/1999 | Strong | |
| 6,009,363 | A | * | 12/1999 | Beckert et al. | 701/33 |
| 6,052,631 | A | | 4/2000 | Busch et al. | |
| 6,055,468 | A | * | 4/2000 | Kaman et al. | 701/33 |
| 6,073,063 | A | | 6/2000 | Leong Ong et al. | |
| 6,084,567 | A | | 7/2000 | Ogawa | |
| 6,104,971 | A | * | 8/2000 | Fackler | 701/33 |
| 6,182,006 | B1 | | 1/2001 | Meek | |

* cited by examiner

VEHICLE SYSTEMS DATA STORAGE

BACKGROUND OF THE INVENTION

This invention relates to a data storage system for a vehicle, and more particularly, the invention relates to a data storage system with a limited size primary storage device.

Heavy duty vehicle operators often use more than one vehicle. Additionally, it is common to track vehicle and driver information for the particular heavy duty vehicle for analysis by a fleet operations facility. Accordingly, it is desirable to utilize portable hand held computing devices, or personal digital assistants (PDA), that may be installed and removed from the vehicles to obtain and transfer data from the operator to the vehicle and vice versa. However, since the PDAs are portable they typically have relatively limited memory. Therefore, to ensure that no data is lost, it is desirable to preserve the data residing in the memory of the PDA.

Mass data storage systems have been used to troubleshoot or diagnose vehicle problems. These data storage systems have been controlled by a program that has been developed by an engineer or technician after a problem has been experienced in the vehicle. As a result, prior art data storage systems are not suitable for identifying and recording information relating to a problem as it occurs in the vehicle. Specifically, if a collision avoidance system on a heavy duty vehicle has been activated it is meaningless to go back at a later date with a program to identify or recreate the events that occurred to activate the collision avoidance system. The memory typically used in a vehicle is limited which is problematic for recording all the data that is available. Therefore, what is needed is a data storage system that can identify a problem and record data as it occurs and download the relevant data for analysis at a later date.

SUMMARY OF THE INVENTION AND ADVANTAGES

In one aspect of the present invention, a vehicle data storage system is provided which includes a plurality of sensors for sensing vehicle operating conditions, such as engine temperature. A control module receives the vehicle operating conditions and translates the vehicle operating conditions into vehicle information. That is, the raw electrical signals are translated into a code representative of particular values. A portable hand held computing device, such as a Handspring® or Palmpilot®, has a data storage device or memory that receives the vehicle information. The data storage device is limited by a particular memory capacity. A secondary storage device receives the vehicle information from the PDA data storage device when the memory capacity reaches a desired memory capacity level, such as when there is only 10% of the memory left in the data storage device. Accordingly, the present invention retains data in the memory of the portable hand held computing device in a secondary storage device so that no data is lost.

In another aspect of the invention, a plurality of subsystem control modules, such as brake and engine control modules, translates the vehicle operating conditions into corresponding vehicle information. One of the vehicle operating conditions in one of the subsystem control modules comprises a triggering event. The triggering event may be detecting a high engine temperature in an engine temperature sensor. The subsystem control module then produces a request signal for event data in response to the triggering event. A memory buffer stores the vehicle information from all of the subsystem control modules. The event data is defined by a first predetermined time before the triggering event to a second predetermined time after the triggering event so that the data surrounding the triggering event resides in the memory buffer. The data in the memory buffer is written over by new data unless a request signal is received. A secondary storage device receives the event data in response to the request signal. Accordingly, data is stored in a secondary storage device when the triggering event occurs in the vehicle so that the data may be analyzed without the need for subsequently attempting to reproduce the vehicle problem.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
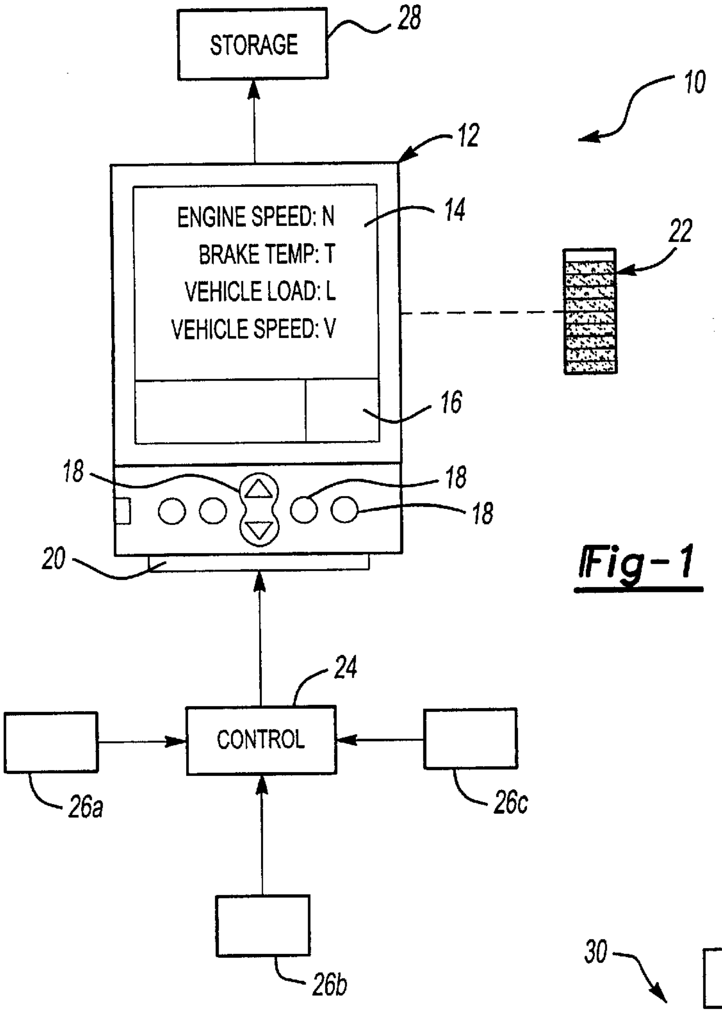
FIG. 1 is a schematic view of one embodiment of the present invention vehicle data storage system.

A vehicle data storage system 10 is shown in FIG. 1. The system 10 includes a portable hand held computing device 12, or personal digital assistant (PDA), such a Handspring® or Palmpilot® device. The PDA 12 includes a display screen 14, preferably a touch screen and a character input screen portion 16 for inputting alphanumeric characters with a stylus onto the touch screens 14 and 16. Additionally, input buttons 18 may also be used to input information into the PDA 12. The PDA 12 includes a data interface 20 for connection to a vehicle databus such as a type J1708 or J1939 databus. The PDA 12 may be received in a cradle for connection to the databus.

The PDA 12 includes a memory 22 for storing data. The vehicle operator may input and store a driver's log into the PDA 12. Additionally, a vehicle maintenance log and a vehicle usage log may all be manually or automatically input into the PDA 12. The memory 22, or data storage device, has a limited capacity with relatively limited memory available.

The vehicle includes various control modules 24 for controlling vehicle systems, such as brake, engine, transmission, or other vehicle systems. Typically a particular vehicle system includes various sensors **26*a*, 26*b*, 26*c*** for sensing various operating conditions within the vehicle system.

The PDA 12 gathers the vehicle information from the control modules 24 and stores the vehicle information into the PDA's memory 22. The PDA 12 may include a program that monitors the memory capacity of the data storage device within the PDA. A secondary storage device 28 may be electrically connected to the PDA 12 or connected by infrared or other means. Once the memory 22 fills with data or other information and reaches a desired memory capacity level, the PDA 12 automatically downloads the vehicle information from the PDA memory 22 to the secondary storage device 28 so that no information is lost. Once the information from the PDA 12 has been downloaded to the secondary storage device 28, the PDA may continue to store vehicle information in the PDA memory 22. The secondary storage device 28 may be any suitable type of storage device such as a memory stick, writable CD, memory card, or portable hard drive. Such storage devices may be located on board the vehicle or located off board the vehicle such as in a fleet management facility. The PDA may transmit the data to the secondary storage device 28 at the fleet management facility by any suitable means. Additionally, the PDA 12 may be a URL link that may be accessed by the fleet management facility. In this manner, a convenient portable hand held computing device is provided that is capable of being installed and removed from the vehicle without losing any data received by, or stored in the portable hand held computing device 12.

Figure 2:
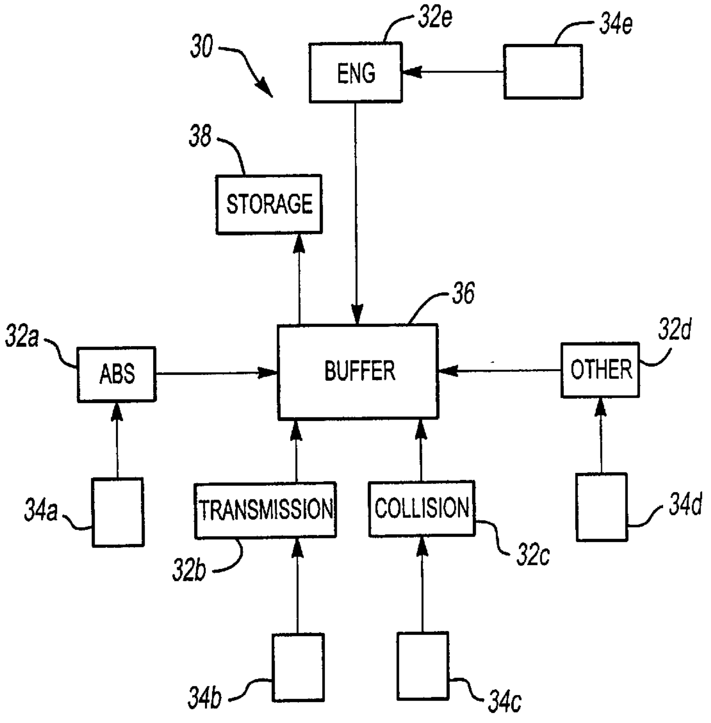
FIG. 2 is a schematic view of another embodiment of a present invention of a vehicle data storage system.

Another embodiment of the present invention is shown in FIG. 2. A vehicle data storage system 30 includes a plurality of subsystem control modules such as a brake control module 32*a,* a transmission control module 32*b,* a collision avoidance control module 32*c,* an engine control module 32*e,* or any other type of engine control module 32*d.* A plurality of sensors 34*a,* 34*b,* 34*c,* 34*d,* and 34*e* correspondingly communicate with the subsystem control modules 32*a,* 32*b,* 32*c,* 32*d* and 32*e* to provide information about the particular vehicle system being controlled. Traditionally, the subsystem control modules were able to be accessed through vehicle databus in only a very limited manner. With the present invention, subsystem control modules are more accessible to make information more available for analysis.

The sensors sense vehicle operating conditions such as temperatures, pressures, valve positions or any other condition. The subsystem control modules translate the vehicle operating conditions into corresponding vehicle information. Vehicle information may include but is not limited to vehicle speed, engine speed, gear position, fluid levels, brake temperatures, bearing temperatures, vehicle load, battery voltage, and brake status in addition to other vehicle information. The vehicle information from all of the subsystem control module systems 32 is sent to a memory buffer 36. As the memory buffer 36 becomes fill, the new vehicle information from the subsystem control modules 32 will overwrite the information already contained on the memory buffer 36.

The subsystem control modules 32 are programmed to recognize problematic vehicle operating conditions. For example, if an engine temperature is high or out of a predetermined range, the engine control module 32*e* will recognize the high engine temperature as a triggering event. When a triggering event has been recognized by a subsystem control module 32, the subsystem control module 32 will direct or command the buffer 36 to transmit the event data surrounding the triggering event to a secondary storage device 38. The event data is defined by a first predetermined time before the triggering event to a second predetermined time after the triggering event. Said another way, the event data includes data, for example, from two minutes before the triggering event to two minutes after the triggering event. However, it is to be understood that the event data may be defined in any number of ways. Unlike some prior art devices, the present invention commands the transfer from event data from the memory buffer in response to a request signal from the subsystem control module having the triggering event. For example, if a temperature sensor 34*e* detects an engine over temperature condition, the engine controller 32*e* will send a request signal to the memory buffer 36 to send the event data to the secondary storage device 38. In this manner, each subsystem control module need not be polled for vehicle information.

A PDA may be provided with the memory buffer 36 if the PDA memory is of a sufficient size to receive vehicle information from all the subsystem control modules. In the event that the PDA has insufficient memory, the vehicle data storage system as described above and shown in FIG. 2 may be used with a PDA.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of storing vehicle data comprising the steps of:

a) gathering vehicle information;

b) storing the vehicle information in a data storage device of a portable handheld computing device;

c) monitoring memory capacity in the data storage device;

d) automatically downloading the vehicle information from the data storage device to a secondary storage device at a desired memory capacity level in the data storage device; and e) continuing to store the vehicle information in the data storage device.

2. The method according to claim 1, wherein the secondary storage device is located onboard a vehicle.

3. The method according to claim 1, wherein the secondary storage device is located off board a vehicle.

4. The method according to claim 3, wherein the off board location is a fleet management facility.

5. The system according to claim 3, wherein said secondary storage device and said portable handheld computing device are linked by the Internet.

6. The method according to claim 1, wherein the vehicle information includes a driver's log.

7. A vehicle data storage system comprising:

a plurality of sensors sensing vehicle operating conditions;

a control module receiving said vehicle operating conditions and translating said vehicle operating conditions into vehicle information;

a portable handheld computing device having a data storage device receiving said vehicle information, said data storage device including a memory capacity; and a secondary storage device receiving said vehicle information from said data storage device when said memory capacity reaches a desired memory capacity level.

8. The system according to claim 7, wherein said secondary storage device is located onboard a vehicle.

9. The system according to claim 7, wherein said secondary storage device is located off board a vehicle.

10. The system according to claim 9, wherein said off board location is a fleet management facility.

11. The method according to claim 7, wherein the portable handheld computing device a screen displaying at least a portion of the vehicle information.

12. A vehicle data storage system comprising:

a plurality of sensors sensing vehicle operating conditions;

a plurality of subsystem control modules translating said vehicle operating conditions into corresponding vehicle information, one of said vehicle operating conditions in one of said plurality of subsystems control modules comprising a triggering event, said one of said plurality of subsystem control modules producing a request signal for event data in response to said triggering event;

a memory buffer storing said vehicle information from said plurality of subsystem control modules, said memory buffer including said event data defined by a first predetermined time before said triggering event to a second time after said triggering event; and a secondary storage device receiving said event data in response to said request signal.

13. A method of storing vehicle data comprising the steps of:

a) sensing a plurality of vehicle operating conditions;

b) translating the vehicle operating conditions in a plurality of subsystem control modules into corresponding vehicle information;

c) storing the vehicle information in a memory buffer;

d) detecting a triggering event;

e) requesting event data comprising vehicle information from a first predetermined time before the triggering event to a second predetermined time after the triggering event; and f) transferring the event data to a secondary storage device.

14. The method according to claim 13, wherein step d) occurs in one of the plurality of subsystem control modules.

15. The method according to claim 14, wherein step e) occurs in the one of the plurality of subsystem control modules.

16. A method of storing vehicle data comprising the steps of:

a) sensing a plurality of vehicle operating conditions;

b) translating the vehicle operating conditions in a plurality of subsystem control modules into corresponding vehicle information;

c) storing the vehicle information in a memory buffer wherein the memory buffer is a portion of a portable hand held computing device;

d) detecting a triggering event;

e) requesting event data comprising vehicle information from a first predetermined time before the triggering event to a second predetermined time after the triggering event; and f) transferring the event data to a secondary storage device.

17. The method according to claim 16, wherein step f) occurs when the memory buffer reaches a desired memory capacity level.

18. The system according to claim 12, wherein one of said plurality of subsystem control modules is an engine control module, and said triggering event is a high engine temperature.

19. The system according to claim 12, wherein one of said plurality of subsystem control modules is a collision avoidance control module.

20. The system according to claim 12, wherein said secondary storage device is a portion of a portable handheld computing device.

21. The system according to claim 12, wherein said memory buffer is a portion of a portable handheld computing device.

22. The system according to claim 21, wherein said memory buffer transfers said vehicle information to said secondary storage device when said memory buffer reaches a desired memory capacity level.

* * * * *